(12) United States Patent
Van Meulenbeke

(10) Patent No.: US 10,167,141 B2
(45) Date of Patent: Jan. 1, 2019

(54) DEVICE FOR TRANSPORTING MOULDS FOR CHOCOLATE OR CONFECTIONERY

(71) Applicant: HACOS, Naamloze Vennootschap, Oostmalle (BE)

(72) Inventor: Pierre Van Meulenbeke, Schilde (BE)

(73) Assignee: HACOS, NAAMLOZE VENNOOTSCHAP, Oostmalle (BE)

( * ) Notice: Subject to any disclaimer, the term of this patent is extended or adjusted under 35 U.S.C. 154(b) by 0 days.

(21) Appl. No.: 15/621,217

(22) Filed: Jun. 13, 2017

(65) Prior Publication Data

US 2017/0354163 A1 Dec. 14, 2017

(30) Foreign Application Priority Data

Jun. 14, 2016 (BE) .................. 2016/0106

(51) Int. Cl.
| | |
|---|---|
| B65G 21/10 | (2006.01) |
| B65G 25/10 | (2006.01) |
| B65G 25/04 | (2006.01) |
| B65G 25/08 | (2006.01) |
| A23G 1/26 | (2006.01) |
| A23G 3/02 | (2006.01) |
| B65G 25/02 | (2006.01) |
| A23G 3/20 | (2006.01) |
| B65G 25/12 | (2006.01) |

(52) U.S. Cl.
CPC .............. *B65G 25/10* (2013.01); *A23G 1/26* (2013.01); *A23G 3/0278* (2013.01); *A23G 3/2046* (2013.01); *B65G 25/02* (2013.01); *B65G 25/04* (2013.01); *B65G 25/08* (2013.01); *B65G 25/12* (2013.01)

(58) Field of Classification Search
CPC ........ B65G 25/04; B65G 25/28; B65G 25/10; B65G 25/12; A23G 1/26; A23G 3/0278; A23G 3/2046
USPC ............................................ 198/750.2, 750.5
See application file for complete search history.

(56) References Cited

U.S. PATENT DOCUMENTS

| | | | | |
|---|---|---|---|---|
| 4,433,775 A | * | 2/1984 | Hollowell | .............. B65G 25/04 198/742 |
| 5,984,076 A | * | 11/1999 | Foster | .................. B65G 25/065 198/750.5 |
| 9,327,908 B2 | * | 5/2016 | Miura | ..................... B65G 25/02 |
| 2011/0041706 A1 | | 2/2011 | Whetston, Jr. | |
| 2017/0152067 A1 | * | 6/2017 | Nakamoto | .............. B65B 43/26 |

FOREIGN PATENT DOCUMENTS

| | | |
|---|---|---|
| DE | 201 08 381 U1 | 1/2002 |
| EP | 0 736 257 B1 | 10/1996 |
| EP | 2 108 263 B1 | 10/2009 |

\* cited by examiner

*Primary Examiner* — Leslie A Nicholson, III
(74) *Attorney, Agent, or Firm* — Young & Thompson

(57) ABSTRACT

A device for transporting molds for chocolate or confectionery is provided with at least one rod that extends below, above or next to the molds, whereby this rod is movable back and forth in its longitudinal direction and is provided with a number of catches for the molds that are placed along its longitudinal direction, whereby the rod is rotatable around its axis so that the catches can rotate from a first position, whereby they can take along the molds, to a second position whereby they are situated below or above the plane of the molds or next to the molds.

16 Claims, 6 Drawing Sheets

DEVICE FOR TRANSPORTING MOULDS FOR CHOCOLATE OR CONFECTIONERY

FIELD OF THE INVENTION

The present invention relates to a device for transporting moulds for chocolate or confectionery.

BACKGROUND OF THE INVENTION

More specifically, the invention is intended for transporting such moulds in a production line for the production of chocolates, chocolate bars, moulded chocolate or confectionery, whereby the moulds are moved from the one production stage to the next.

Such devices are already known in the chocolate and confectionery industry, whereby use is made of a conveyor line that is equipped with chains that are put into motion by means of sprockets.

The conveyor line is provided with catches that are affixed at a regular distance from one another. The catches will push the moulds forward on the conveyor belt.

A disadvantage of such a known conveyor line is that special facilities must be provided for the safety of the rotating parts.

Another disadvantage lies in the fact that the hygiene regulations are very strict because foodstuffs are being processed. As the chains consist of many small parts, the maintenance and cleaning thereof is very laborious so that it is difficult to satisfy the strict standards.

An additional disadvantage is that such conveyor lines are relatively large, because the chains turn around to form a closed loop, whereby only the top part of the chains will transport the moulds and whereby the bottom part only serves to close the loop but will not further participate in the transport of the moulds.

Likewise conveyor belts are already known where the moulds are placed behind one and another, and whereby by pushing the rearmost mould forward the moulds are put into motion and move further over the conveyor belt.

Although no rotating parts or chains participate in this, which improves the safety and facilitates the maintenance, such a 'push system' has the disadvantage that the speed is relatively limited.

Indeed, if too much force is exerted on the rearmost mould to be able to move the moulds faster, the moulds can move upwards, 'slip over one another' or can be pushed out.

As a result of this the production speed is limited.

Moreover, the moulds must have very accurate dimensions to ensure that their correct position is guaranteed during the various production stages.

An anomalous dimension of one or more moulds will ensure that the moulds deviate from their position, which can create problems when filling the moulds for example.

Moreover, chocolate or confectionery can also get between the moulds, so that their position also deviates because the moulds are no longer against one another because chocolate or confectionery is in between them.

SUMMARY OF THE INVENTION

The purpose of the present invention is to provide a solution to any one of the aforementioned and other disadvantages.

The object of the present invention is a device for transporting moulds for chocolate or confectionery, whereby this device is provided with at least one rod that extends below, above or next to the moulds, whereby this rod is movable back and forth in its longitudinal direction and is provided with a number of catches for the moulds that are placed along its longitudinal direction, whereby the rod is rotatable around its axis so that the catches can rotate from a first position, whereby they can take along the moulds, to a second position whereby they are situated below or above the plane of the moulds or next to the moulds.

As a result of the back and forth motion of the rod and the simultaneous rotation of the rod between the first and second position at suitable times, the moulds can be moved.

An advantage is that there are no rotating parts or chains, such that the device is safer and easier to maintain and clean.

Also a looped conveyor belt of chains or similar is not needed and the device can be constructed relatively compactly.

Another advantage is that the speed of the movement is higher than with traditional 'push system' conveyor belts, because the moulds are pushed by the catches, instead of being pushed by one another.

As a result the dimensions of the moulds are less critical.

If the rod or rods are located below the moulds, in the second position the catches will be below the plane of the moulds. This means that the rod will rotate such that the catches 'tilt downwards'. If the rod is located above the moulds, in the first position the catches will be oriented downwards with respect to the rod and in the second position they will 'tilt upwards'.

If the rods are located next to the moulds, the catches will extend approximately horizontally in the first position towards the moulds. In the second position they will tilt upwards or downwards, i.e. away from the moulds.

It is clear that wherever the rods are located with respect to the moulds, in the first position the catches can always make contact with the moulds when the rod moves back and forth, and in the second position cannot make contact with the moulds when the rod moves back and forth.

BRIEF DESCRIPTION OF THE DRAWINGS

With the intention of better showing the characteristics of the invention, a preferred embodiment of a device for transporting moulds for chocolate or confectionery according to the invention is described hereinafter, by way of an example without any limiting nature, with reference to the accompanying drawings, wherein.

DETAILED DESCRIPTION OF THE INVENTION

Figure 1:
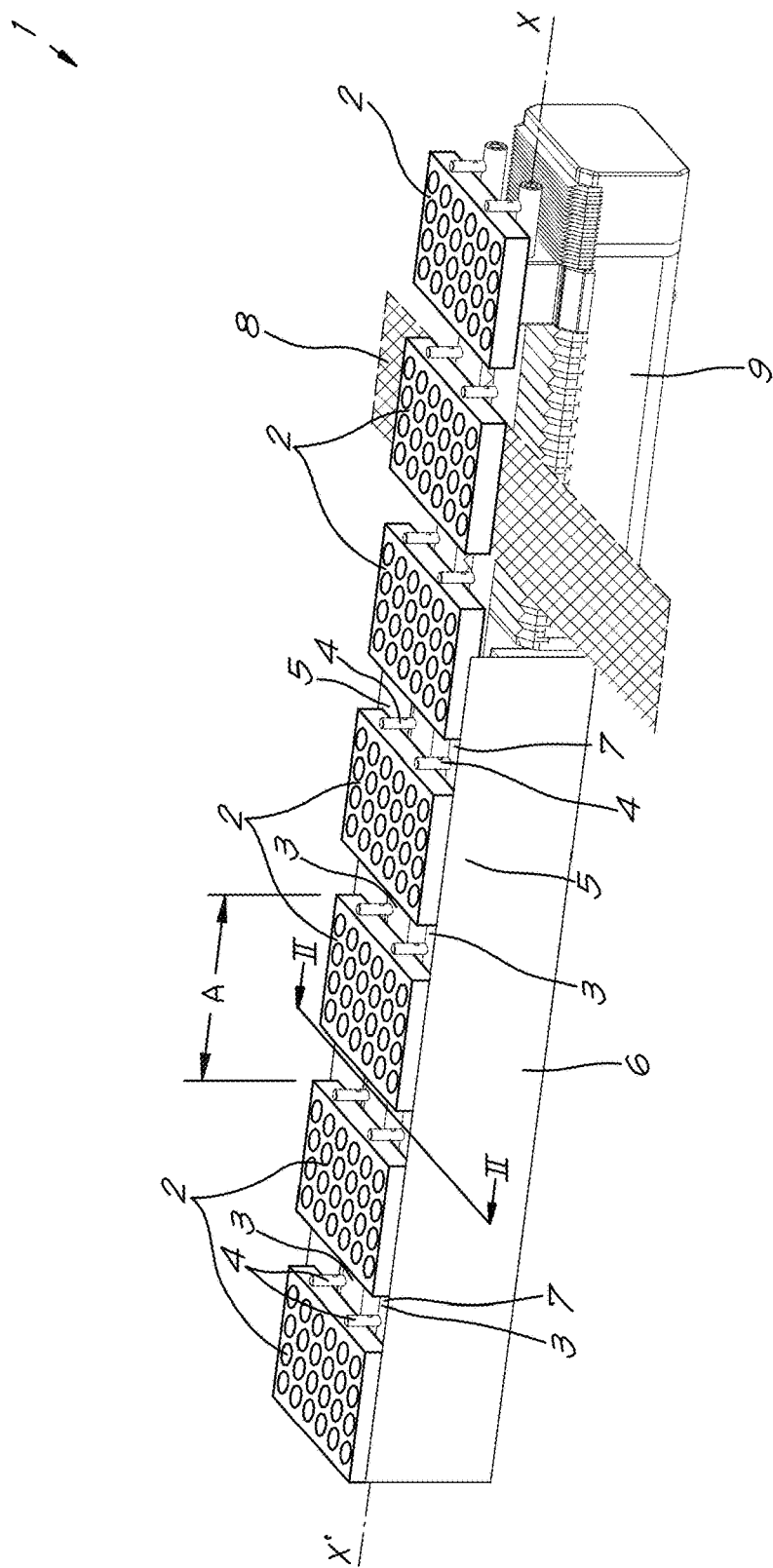
FIG. 1 schematically shows a perspective view of a device according to the invention, with a partial cutaway.

FIG. 1 schematically shows a device 1 according to the invention for the transport of moulds 2, whereby certain parts have been partially cut away for the purpose of clarity.

In this case the moulds 2 are moulds 2 for chocolates, but they could also be other moulds 2 or forms.

The device 1 comprises a number of rods 3; in this case, but not necessarily, two rods.

It can also only be one rod 3 or more than two. The number of rods 3 will depend on the dimensions of the moulds 2 for example.

In this case the rods 3 extend below the moulds 2 and are provided with a number of catches 4 for the moulds 2.

It is also possible that the rod 3 or rods 3 extend above the moulds 2, or that the rods 3 are located next to the moulds 2, which means at the same level as the moulds 2.

As can be seen in FIG. 1, in this case the catches 4 are placed at a regular distance A from one another along the longitudinal direction X-X' of the rods 3.

The rods 3 are placed next to one another in parallel, whereby the catches 4 of the rods 3 are equal to or aligned with respect to one another.

In this case, but not necessarily, the catches 4 are fastened to the rods 3 by being screwed down.

This has the advantage that the catches 4 can be easily replaced in the event of a defect or wear and tear.

In this case the catches 4 are formed by round tubular elements, but is it clear that many different possible embodiments are possible.

Figure 2:
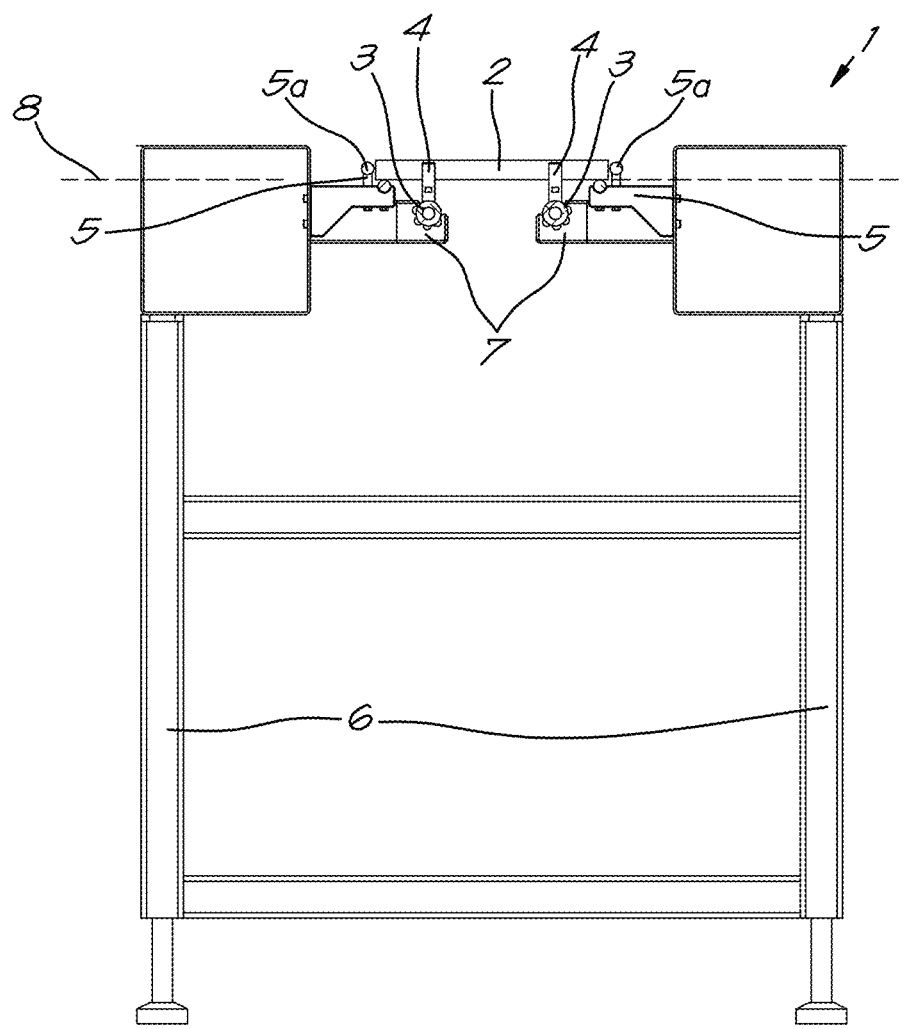
FIG. 2 schematically shows a cross-section according to line II-II of FIG. 1.

As can be clearly seen in FIG. 2, the device 1 is provided on either side of the rods 3 with supports 5 for the moulds 2 that extend in the longitudinal direction X-X' of the rod 3, over which the moulds 2 can move. In other words, the supports 5 are below the moulds 2.

In this case, but not necessarily, these supports 5 take on the form of L-shaped profiles and are mounted in a frame 6 by which the device 1 rests on the base.

It is also possible that the supports 5 are located between the rods 3.

It is also possible that the supports 5 are located (just) below the rods 3, if the rods 3 extend above the moulds 2.

In such a case, but not necessarily, the supports 5 are provided with round bars 5a, whereby one is located next to the mould 2 and one under the mould 2. The moulds 2 will make contact with these bars 5a.

By making use of the supports 5, the moulds 2 do not have to rest on or make contact with the rods 3.

It is clear that these supports 5 can be constructed in many different ways.

Furthermore, FIG. 2 shows that the rods 3 have a circular cross-section. This has the advantage, for example, that they can be supported in (half) bearings 7, as shown in FIGS. 1 and 2.

The rods 3 can move back and forth in their longitudinal direction X-X', i.e. in line with their axis X-X'.

Alongside this translation motion, the rods 3 can also rotate around their axis X-X' so that in this way the catches 4 can be moved from a first position, as shown in FIG. 1, to a second position where in this case the catches 4 are located below the plane 8 of the moulds 2.

It is clear that in the first position the catches 4 can take the moulds 2 along or shift/move them, while this will not be the case in the second position.

It is clear that if the rods 3 are above the moulds 2, the catches 4 will be located in the second position above the plane 8 of the moulds 2.

In this case the two rods 3 will rotate towards one another so that the catches 6 turn towards one another from the first position to the second position.

In order to realise the movement of the rods 3, the device is preferably provided with means 9 to be able to move the rods back and forth and rotate them.

In such a case these means 9 are constructed in the form of an electrical drive. It is not excluded that a pneumatic drive or similar is used.

The operation of the device 1 is very simple and shown in FIGS. 1 to 6.

A number of moulds 2 for chocolate and/or confectionery are located on the supports 5, as shown in FIG. 1, whereby the catches 4 are in the aforementioned first position.

Figure 3:
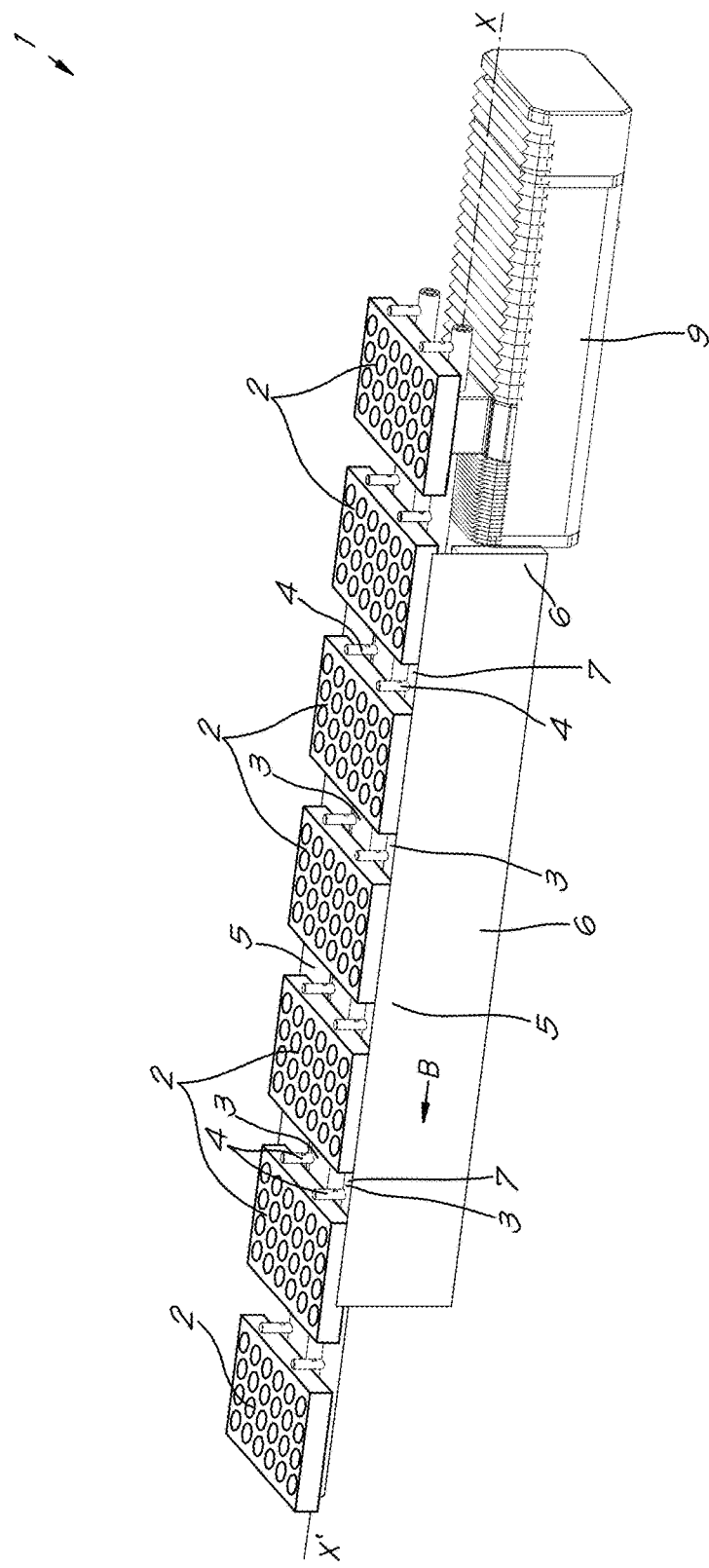
FIGS. 3 to 6 schematically show the device of FIG. 1, but in different states.

Then the rods 3 are driven by the drive 9 and they move simultaneously in the direction in which the moulds 2 must be moved forward, as shown by arrow B in FIG. 3.

As a result the catches 4 will take along the moulds 2, i.e. push or move them forward over the supports 5. Because there are two rods 3, there are two catches 4 for each mould 2. This has the advantage that the moulds 2 will not move obliquely, but will be carried along properly.

Figure 4:
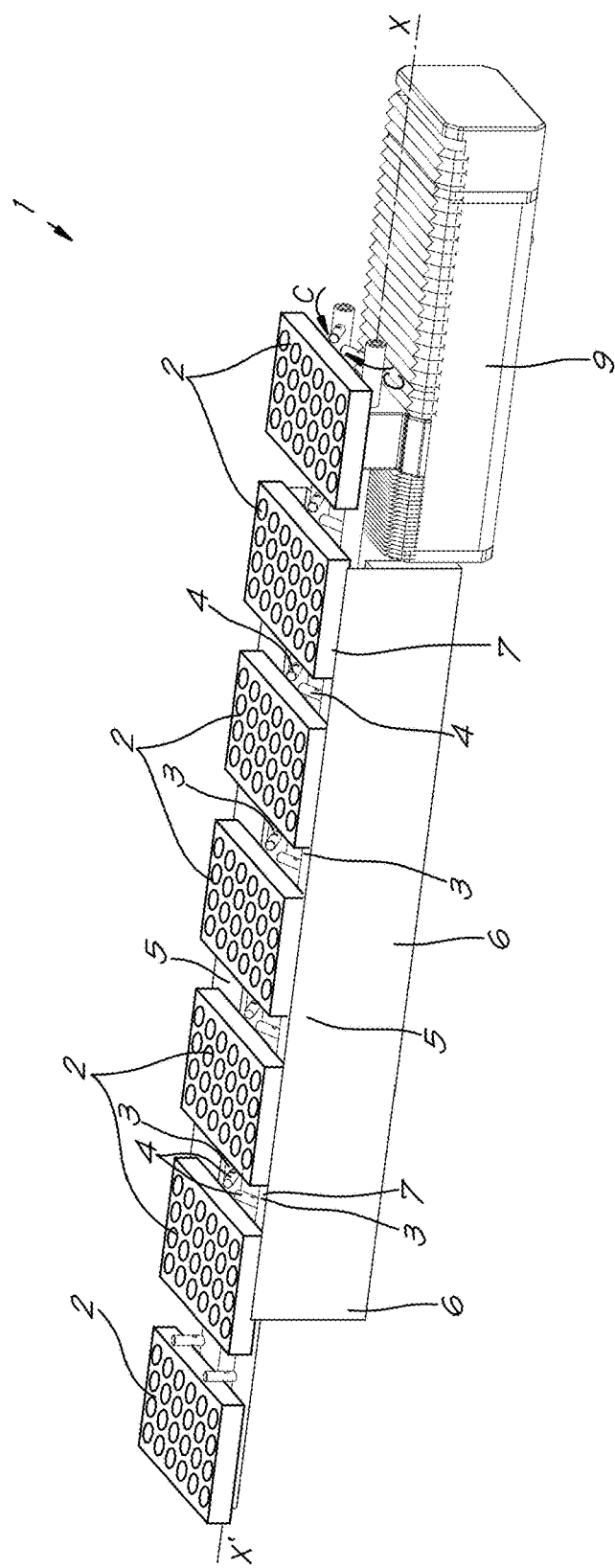

The rods 3 will then rotate according to arrow C, so that the catches 4 will be tilted downwards as it were, as can be seen in FIG. 4. It must be noted here that the rods 3 must not rotate 180°, but a smaller angle of rotation is also sufficient, provided that the catches 4 are located below the plane 8 of the moulds 2 after this rotation.

Because the moulds 2 rest on the supports 5 and not on the rods 3, the moulds 2 will experience little, if any, influence from this rotation, i.e. they will not move.

Moreover, in this case the catches 4 of the two rods 3 will move towards one another, so that if the moulds 2 nonetheless experience an influence or force from the rotating rods 3 and catches 4, these forces will be counteracted so that their resultant is reduced to zero.

Figure 5:
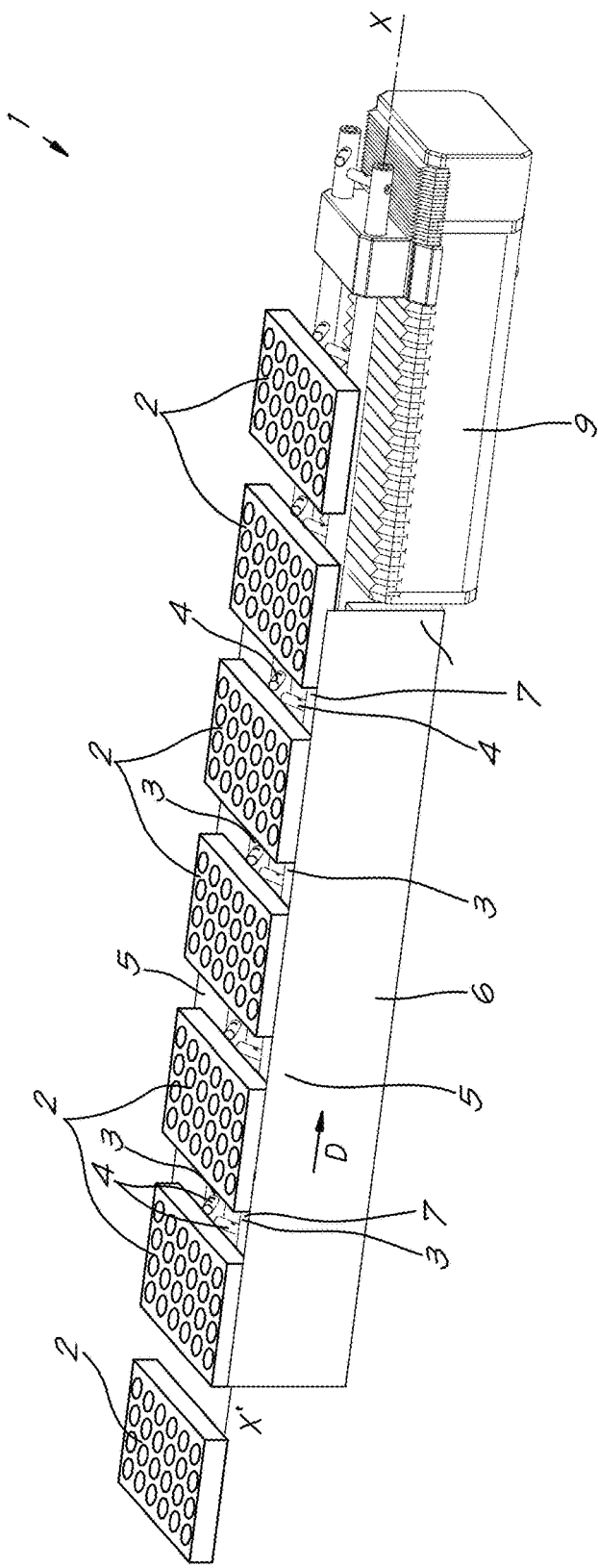

Then the rods 3 will again move on in their longitudinal direction X-X', but then in the opposite direction to the previous step, i.e. against the direction in which the moulds 2 must be moved forward. This is shown in FIG. 5 by arrow D.

Figure 6:
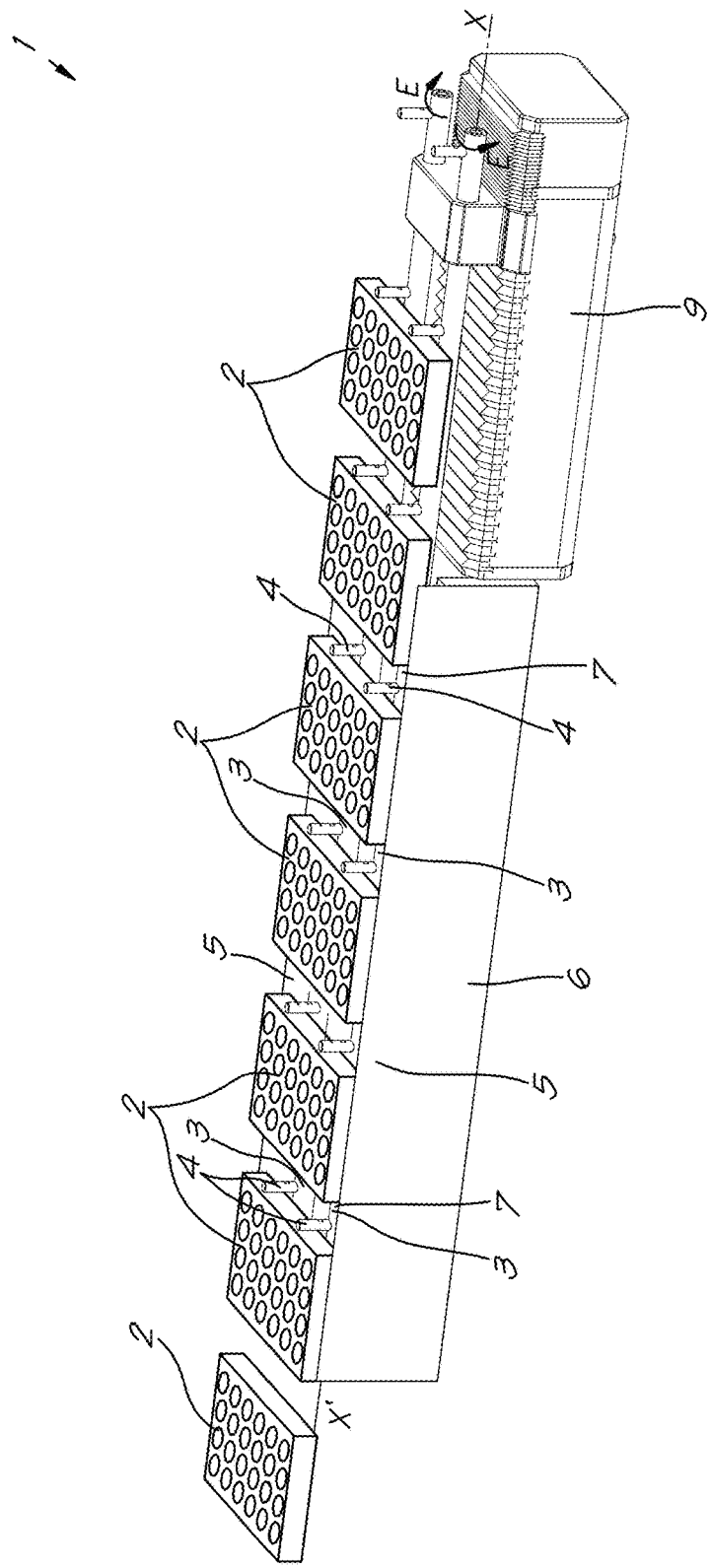

In a last step the rods 3 again rotate around their axis X-X', so that the catches 4 come upwards again, to the aforementioned first position, ready to move moulds 2 forward, as shown in FIG. 6.

This situation is similar to the one of FIG. 1, with the difference that the moulds 2 are all moved along by one position.

A next mould 2 can now be placed on the created empty position and the aforementioned steps can be repeated.

By repeating the previous steps, the moulds 2 can be moved.

The present invention is by no means limited to the embodiment described as an example and shown in the drawings, but a device for transporting moulds for chocolate or confectionery according to the invention can be realised in all kinds of forms and dimensions without departing from the scope of the invention.

The invention claimed is:

1. Device for transporting moulds for chocolate or confectionery, comprising:
   at least two rods that extend in parallel to one another below, above or next to the moulds;
   each of said at least two rods being movable back and forth along its respective longitudinal direction and being provided with a number of catches for the moulds that are distributed along its respective longitudinal direction;
   wherein said catches of one of said at least two rods are positioned transversely relative to said catches of the other of said at least two rods;
   each of said at least two rods being rotatable about its respective longitudinal direction so that its respective catches can rotate from a first position in which they can convey the moulds, to a second position in which they are situated below or above or in a non-conveying position next to the moulds.

2. The device according to claim 1, wherein said at least two rods are two rods that rotate towards one another to turn said catches from the first position to the second position.

3. The device according to claim 1, wherein said catches are fastened to said at least two rods by being screwed down.

4. The device according to claim 1, further comprising supports for the moulds that extend parallel to said at least two rods and under the moulds, over which the moulds can slide.

5. The device according to claim 4, wherein said supports are located on either side of said at least two rods.

6. The device according to claim 1, further comprising a drive that moves said at least two rods back and forth.

7. The device according to claim 6, wherein said drive is an electrical or pneumatic drive.

8. The device according to claim 1, wherein each of said at least two rods has a circular cross-section.

9. The device according to claim 1, wherein said catches are formed by round tubular elements.

10. The device according to claim 2, wherein said catches are fastened to said at least two rods by being screwed down.

11. The device according to claim 2, further comprising supports for the moulds that extend parallel to said at least two rods and under the moulds, over which the moulds can slide.

12. The device according to claim 3, further comprising supports for the moulds that extend parallel to said at least two rods and under the moulds, over which the moulds can slide.

13. The device according to claim 2, further comprising a drive that moves said at least two rods back and forth.

14. The device according to claim 3, further comprising a drive that moves said at least two rods back and forth.

15. The device according to claim 4, further comprising a drive that moves said at least two rods back and forth.

16. The device according to claim 5, further comprising a drive that moves said at least two rods back and forth.

* * * * *